July 31, 1934.  G. HUGEL ET AL  1,968,208
HYDROGENATION OF ORGANIC SUBSTANCES
Filed Aug. 1, 1927
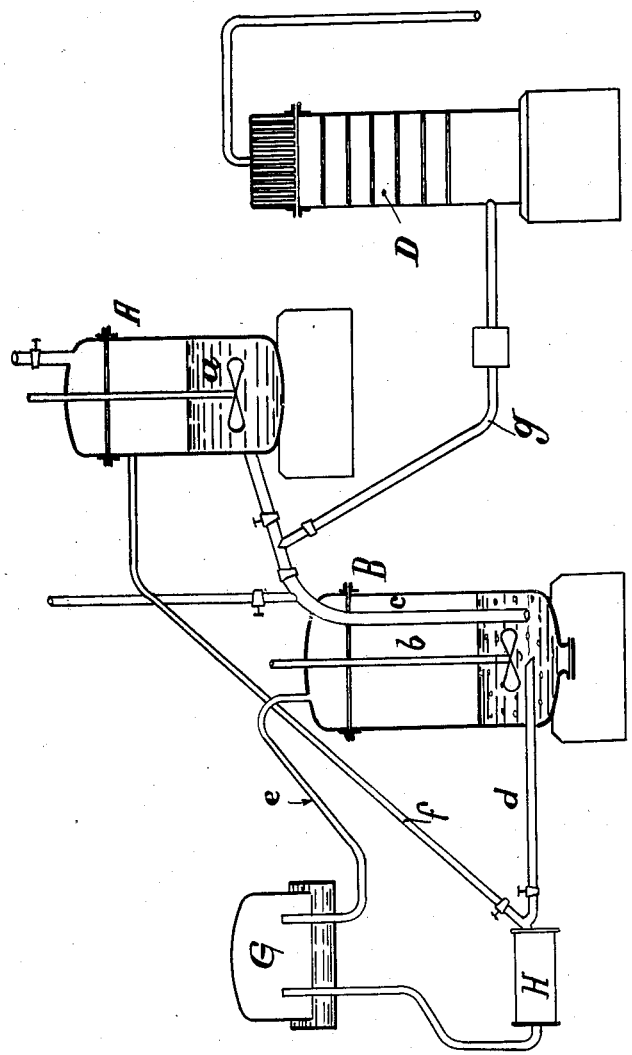
Fig:1

Patented July 31, 1934

1,968,208

UNITED STATES PATENT OFFICE 1,968,208

HYDROGENATION OF ORGANIC SUBSTANCES

Georges Hugel, Strasburg, Marcel Paul, Nancy, and Maurice Boistel, Brebach, France, assignors to Société d'Etudes Chimiques Appliquées "S. E. C. A", Nancy, France, a French company Application August 1, 1927, Serial No. 209,868
In Germany February 28, 1927

7 Claims. (Cl. 196—53)

This invention relates to a process for the hydrogenation of organic substances, especially the products of the distillation of coal and petroleum, with a view to obtaining carburetting agents and lubricating oils. The said process is characterized by the application to the treatment of the said substances of hydrides of the alkali and alkaline-earth metals such as sodium, rubidium, caesium, calcium, strontium, lithium and barium as hydrogenating catalysts, which have, in this particular case, a very powerful catalytic action.

The hydrogenating catalytic properties of these hydrides of the alkali and alkali earth metals are such as to make possible the hydrogenation in commercial quantities, at temperatures and pressures below 300° centigrade and 100 kilograms respectively, and therefore far inferior to those employed in the processes, such as that of Bergius, hitherto known, of the aforesaid organic substances, and particularly of certain of the said substances, such as pitch from tar and petroleum, the hydrogenation of which has hitherto been recognized as one of the most difficult problems to solve in the whole of this art. Moreover, and this is essential, the catalytic action of the said hydrides is in nowise affected by the presence of poisons, such as nitrogenous, sulphidic, arsenated and oxygenated substances.

The process according to the invention consists generally, in first preparing the hydride of the alkali or alkali earth metal used as catalysts, in stabilizing said hydride by the addition of organic bodies capable of covering said hydride with a shelter coating, examples of which are indicated below, in placing said hydride thus stabilized in the presence of the substance to be hydrogenated and finally in admitting hydrogen under pressure.

The course of a complete operation will now be described by way of example with reference to the accompanying drawing.

Sodium, in a finely divided or fragmentary condition, is introduced into an autoclave A, provided with a stirring device a, and sodium hydride is formed by simple contact of the metal with hydrogen under pressure, admitted into the autoclave A through the branch f by means of a compressor H, which draws the gas from a producer G. During this operation, the temperature should not exceed 300° centigrade. The resulting sodium hydride would be readily decomposed in the air, but it can be stabilized by impregnation with organic solvents, such as tetraline or other hydrocarbons, or amides of the corresponding metals, such as sodium amide, may also be employed for the same purpose. Moreover, these stabilizers may also be applied to all other hydrides of alkalis or alkaline earths.

The hydride stabilized in this manner will serve, as desired, for hydrogenating all the products of the distillation of coal tars, the tars from petroleum, native asphaltums, mineral oils, and the like.

The organic stabilizers above referred to could also be replaced by inert substances capable of increasing the surface of reaction.

The apparatus employed for the hydrogenation, consists, in nearly all cases, of an autoclave B, provided with stirrers b, into which the products to be hydrogenated and the stabilized catalyst from the autoclave A are introduced and agitated in order to ensure intimate admixture. The said catalyst and products to be hydrogenated are introduced through a pipe c, which dips into the autoclave B and may also serve to evacuate the products of the reaction. In addition, hydrogen is admitted under pressure through a pipe d connected to the compressor H, it being preferable to employ a feeding device which enables the hydrogen to bubble through the liquid mass, for example a pipe d which opens into the lower part of the autoclave B. The uncombined hydrogen may be led away through a discharge pipe e and returned to the reaction autoclave by way of the gas holder G and compressor H.

When the operation is ended, the resulting products are drawn off through the pipe c and subjected to fractional distillation, by leading them into a suitable apparatus D through a pipe g.

To consider the most difficult case, if, for example, it is desired to treat coal tar pitch, even rich in free carbon, in a plant of this kind, it is hydrogenated at a temperature of about 300° centigrade and under a lower pressure than 100 kilograms. The amount of the sodium hydride is, for example, about 10 per cent, of the weight of the pitch, and the resulting product is a reddish-brown liquid, with green fluorescence, which, on distillation, gives fractions corresponding to the entire range from benzol to the extra heavy oils, but in different proportions depending on the one hand on the conditions of temperature, pressure, the quantity of the catalyst and the duration of the reaction, and on the other on the conditions of the ulterior distillations employed.

All these products are free from injurious substances, are fast to light without refining and are perfectly inodorous.

What we claim is:

1. A process for the treatment of distillation products of coal and petroleum which comprises mixing said products with a small quantity of the hydride of one of the metals of the alkali and alkaline earth groups and causing hydrogen to act upon said mixture at a temperature and pressure at which said hydride exerts a catalytic effect, and subsequently removing the hydride, which acts as a catalytic agent and is not transformed.

2. A process for the treatment of distillation products of coal and petroleum which comprises preliminarily preparing the hydride of one of the metals of the alkali and alkaline earth groups, adding to said hydride organic bodies capable of protecting it from decomposition by air or moisture, mixing a small quantity of the hydride thus treated with the distillation products of coal and petroleum, and causing hydrogen to act upon said mixture at a temperature and pressure suitable for converting the initial material into hydrocarbons of lower boiling points.

3. A process for the treatment of distillation products of coal and petroleum which comprises preliminarily preparing the hydride of one of the metals of the alkali and alkaline earth groups, stabilizing the same against decomposition by air or moisture, mixing a small quantity of the hydride thus stabilized with the distillation products of coal and petroleum, causing hydrogen to act upon said mixture at a temperature and pressure suitable for converting the initial material into hydrocarbons of lower boiling points, and subsequently removing the hydride, which acts as a catalytic agent and is not transformed.

4. A process for the treatment of distillation products of coal and petroleum free from oxides of carbon which comprises preliminarily preparing the hydride of one of the metals of the alkali and alkaline earth groups, adding to said hydride the amide of the corresponding metal in order to stabilize it, so as to preserve it from the action of air and moisture and to modify its catalytic activity, mixing a small quantity of the hydride thus stabilized with the distillation products of coal and petroleum, causing hydrogen to act upon said mixture at a temperature below 300° C. and under a pressure below 100 kilograms, and subsequently removing the hydride, which acts as a catalytic agent and is not transformed.

5. A process for the treatment of distillation products of coal and petroleum which comprises preliminarily preparing the hydride of one of the metals of the alkali and alkaline earth groups by simple contact of said metal with hydrogen under pressure, stabilizing the hydride against decomposition by air or moisture by adding to said hydride an inert body capable of increasing its surface of reaction, mixing a small quantity of the hydride thus treated with the reaction products of coal and petroleum, and causing hydrogen to act upon said mixture at a temperature and pressure suitable for converting the initial material into hydrocarbons of lower boiling points.

6. A process for the conversion of coal tar pitch into motor fuel which comprises preliminarily preparing sodium hydride, adding to said sodium hydride organic bodies capable of covering it with a shelter coating thereby stabilizing it against decomposition, mixing about 10% in weight of the thus stabilized sodium hydride with the coal tar pitch free from oxides of carbon, causing hydrogen to act upon said mixture at a temperature of about 300° C. and under a pressure of about 100 atmospheres, and subsequently removing the sodium hydride, which acts as a catalytic agent and is not transformed.

7. A process for the treatment of distillation products of coal and petroleum free from oxides of carbon which comprises preliminarily preparing the hydride of one of the metals of the alkali and alkaline earth groups, stabilizing the same against the action of air and water, mixing a small quantity of the hydride thus treated, used as a catalyst, with the distillation products of coal and petroleum, and causing hydrogen to act upon said mixture at temperatures and pressures suitable for converting the initial material into hydrocarbons of lower boiling points.

GEORGES HUGEL.
MARCEL PAUL.
MAURICE BOISTEL.